United States Patent [19]

Dillard, Jr. et al.

[11] 3,994,531

[45] Nov. 30, 1976

[54] METHOD OF SOLUTION MINING POTASSIUM CHLORIDE FROM SUBTERRANEAN DEPOSITS

[75] Inventors: David S. Dillard, Jr.; J. Gilbert Davis, II; Richard L. Every, all of Ponca City, Okla.

[73] Assignee: Continental Oil Company, Ponca City, Okla.

[22] Filed: Sept. 3, 1971

[21] Appl. No.: 177,732

[52] U.S. Cl. .................................... 299/5; 23/297; 23/298; 23/300; 23/302 R; 423/184; 423/208; 423/499
[51] Int. Cl.² ..................... B01D 9/02; B01D 11/04; C01D 3/08; C01D 3/16
[58] Field of Search ................. 23/312 R, 297, 296, 23/298, 299, 300, 302; 299/4, 5; 423/184, 208, 499

[56] References Cited
UNITED STATES PATENTS

| | | | |
|---|---|---|---|
| 1,215,546 | 2/1917 | Jones | 23/297 |
| 1,353,283 | 9/1920 | Lilsbee | 23/297 |
| 1,432,796 | 10/1972 | Lilsbee | 23/297 |
| 1,878,586 | 9/1932 | Kipper | 23/297 |
| 2,161,800 | 6/1939 | Cross | 23/297 |
| 3,355,212 | 11/1967 | Day | 23/312 R |
| 3,440,023 | 4/1969 | Hoppe | 23/297 |
| 3,642,454 | 2/1972 | Nylander | 23/297 |

Primary Examiner—Stephen J. Emery
Attorney, Agent, or Firm—Richard W. Collins

[57] ABSTRACT

The present invention relates to an improved method of solution mining potassium chloride from subterranean ore deposits containing both potassium chloride and sodium chloride. By the present invention, an aqueous medium is passed through the ore deposits so that potassium chloride and sodium chloride are dissolved therein. Magnesium chloride is combined with the aqueous brine solution formed so that an aqueous brine solution containing potassium chloride, sodium chloride and magnesium chloride in specific proportions is produced, and the solubility of potassium chloride in the solution is reduced. The combined aqueous brine solution is then concentrated so that it is substantially saturated with potassium chloride, and the concentrated solution is cooled to cause the precipitation of substantially pure potassium chloride. Advantageously, the magnesium chloride combined with the aqueous brine solution is obtained by solution mining a second subterranean ore deposit containing magnesium chloride and combining the brine solutions formed.

13 Claims, 2 Drawing Figures

INVENTORS
DAVID S. DILLARD JR.,
J GILBERT DAVIS II &
RICHARD L. EVERY

BY William J. Miller
ATTORNEY

METHOD OF SOLUTION MINING POTASSIUM CHLORIDE FROM SUBTERRANEAN DEPOSITS

BACKGROUND OF THE INVENTION

1. Field of the Invention

The present invention relates to a method of mining potassium chloride from a subterranean deposit, and more particularly, but not by way of limitation, to an improved method of solution mining potassium chloride from subterranean deposits containing potassium chloride and sodium chloride.

2. Description of the Prior Art

Potassium chloride has been produced commercially for some time by dry mining subterranean mineral deposits which contain relatively high quantities of potassium chloride, e.g., sylvinite deposits. Sylvinite deposits are found in many places, generally at depths of from about 300 to 3,000 feet, and contain sodium chloride as well as potassium chloride.

Commercial dry mining of sylvinite deposits for potassium chloride is similar to the shaft mining of coal in that solid sylvinite ore is brought to the surface through shafts, etc., and then treated to separate potassium chloride from other ore components, primarily sodium chloride. Such dry mining is generally limited to depths above about 3,500 feet because of the high cost of sinking shafts and maintaining sufficient support in mined subsurface rooms.

In some areas, sylvinite deposits rich in potassium chloride are found at depths of from about 4,000 to about 6,000 feet. Since dry mining these sylvinite deposits is prohibited by economic and safety considerations, solution mining of the deposits has heretofore been proposed and utilized. That is, an aqueous medium such as water is pumped through the subterranean ore deposits so that both potassium chloride and sodium chloride are dissolved therein. The brine solution formed is removed from the formation and treated to recover relatively pure potassium chloride. The simplest treatment of potassium chloride-sodium chloride brine for potassium chloride recovery is based on the difference in solubility of potassium chloride and sodium chloride in water at various temperatures. That is, the higher the temperature of a potassium chloride-sodium chloride brine solution, the greater the solubility of potassium chloride, but the lower the solubility of sodium chloride. Thus, upon heating the brine solution, sodium chloride is precipitated, and upon cooling the brine solution, potassium chloride is precipitated, provided the saturation limits of the brine solution are reached.

In the solution mining of subterranean ore deposits containing both potassium chloride and sodium chloride wherein the potassium chloride is present in the ore in a minor quantity as compared to the sodium chloride, it is not possible to obtain a brine saturated in potassium chloride by dissolution of the ore in an aqueous medium. That is, the salts contained in the subterranean deposit dissolve in the aqueous medium in proportion to their presence in the ore until saturation in the most abundant salt is achieved. Thus, in solution mining a subterranean deposit such as sylvinite which is lean in potassium chloride (less than 50% potassium chloride), the solution reaches saturation in sodium chloride with the potassium chloride content considerably less than that required to saturate the solution. In order to recover a practical quantity of potassium chloride from a potassium chloride-sodium chloride brine by cooling the brine, the initial solution must be saturated or at least 90% saturated in potassium chloride.

Heretofore, it has been proposed to concentrate the brine solution obtained from mining subterranean ore deposits lean in potassium chloride by removing water therefrom so that the brine is saturated in potassium chloride. While a variety of methods of removing water have been proposed, conventional evaporation is the most practical method of removing water from a potassium chloride-sodium chloride brine. However, as is well understood by those skilled in the art, evaporation of potassium chloride-sodium chloride brine to reach potassium chloride saturation is an expensive process, and where the brine produced is relatively lean in potassium chloride thereby requiring a considerable quantity of water to be removed, solution mining of the potassium chloride deposit is economically unattractive.

By the present invention, an improved method of solution mining subterranean ore deposits containing sodium chloride and potassium chloride, particularly those deposits lean in potassium chloride as compared to sodium chloride, is provided wherein the water removal required in order to reach saturation in potassium chloride is significantly reduced.

SUMMARY OF THE INVENTION

The present invention relates to a method of mining potassium chloride from a subterranean deposit containing potassium chloride and sodium chloride which comprises passing an aqueous medium through said deposit so that potassium chloride and sodium chloride are dissolved therein, combining magnesium chloride with the aqueous brine solution formed so that an aqueous brine solution containing potassium chloride, sodium chloride and magnesium chloride in specific proportions is produced and the solubility of potassium chloride in the solution is reduced, concentrating the combined aqueous brine solution so that the solution is substantially saturated with potassium chloride, and cooling the concentrated solution so that substantially pure potassium chloride is precipitated therefrom.

It is, therefore, a general object of the present invention to provide an improved method of solution mining potassium chloride from a subterranean deposit.

A further object of the present invention is the provision of an improved method of solution mining potassium chloride from subterranean deposits containing both potassium chloride and sodium chloride.

Yet a further object of the present invention is the provision of an improved method of solution mining potassium chloride from a subterranean sylvinite formation wherein a minimum quantity of water is required to be removed from the brine solution formed.

Other and further objects, features and advantages of the present invention will be apparent from the following description of the preferred embodiments of the invention taken in conjunction with the accompanying drawings.

DESCRIPTION OF THE PREFERRED EMBODIMENTS

Broadly described, the present invention comprises passing an aqueous medium such as water or a dilute aqueous salt solution through a subterranean ore deposit containing potassium chloride and sodium chloride in a conventional manner such that these salts are dissolved in the medium forming an aqueous brine solution thereof. Magnesium chloride is combined with the aqueous brine solution formed so that an aqueous brine solution containing potassium chloride, sodium chloride and magnesium chloride in specific proportions of each is produced and so that the solubility of potassium chloride in the solution is reduced. The brine solution is then concentrated in a conventional manner such as by evaporation so that it is substantially saturated with potassium chloride. Sodium chloride precipitated during the concentration step is recovered. The remaining concentrated solution is cooled which causes the precipitation of substantially pure potassium chloride which is recovered by separation from the mother liquor. Small amounts of the mother liquor which may adhere to the crystallized potassium chloride after separation from the mother liquor are not usually sufficient to contaminate the potassium chloride. However, if desired, such adhering mother liquor may be removed by washing with water or by other conventional separation methods.

In a typical solution mining situation where sylvinite which is relatively lean in potassium chloride is being mined, the produced sylvinite brine is at best approximately 60% saturated in potassium chloride at the mining temperature (generally about 140° F). Such lean sylvinite ores generally contain about two parts sodium chloride to one part potassium chloride and the salts dissolve in an aqueous medium in approximately the ratio they are present in the deposit until saturation in the most abundant salt is reached. Thus, the brine solution formed from lean sylvinite is saturated in sodium chloride but substantially under-saturated in potassium chloride.

Figure 1:
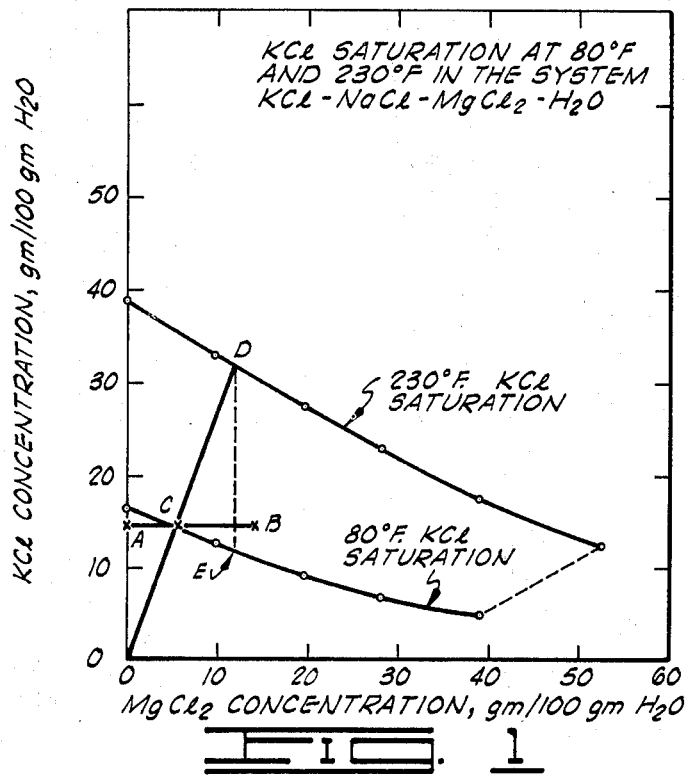
FIG. 1 is a graph showing the saturation concentration of potassium chloride at 80° and 230° F for various magnesium chloride concentrations in an aqueous brine solution saturated with sodium chloride and containing potassium chloride and magnesium chloride.
Figure 2:
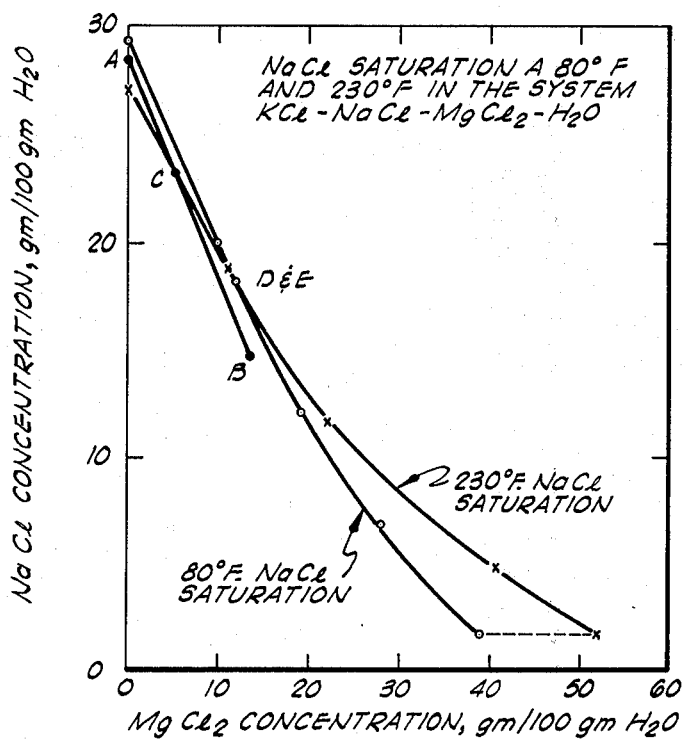
FIG. 2 is a graph showing the saturation concentration of sodium chloride at 80° and 230° F for various magnesium chloride concentrations in an aqueous brine solution saturated with potassium chloride and containing sodium chloride and magnesium chloride.

The present invention is based on the discovery that when magnesium chloride is added to a brine solution containing sodium chloride and potassium chloride, the solubility of potassium chloride in the solution is reduced. Referring to FIGS. 1 and 2, it may clearly be seen that the presence of magnesium chloride has a marked suppression effect on the solubility of both potassium chloride and sodium chloride in water, and that the suppression effect is greater for potassium chloride than for sodium chloride with changes in temperature from 80° to 230° F, the boiling point of a typical brine solution and the temperature to which the brine solution can be cooled economicall at typical atmospheric conditions. Specifically, at a magnesium chloride concentration of about 10% by weight in an aqueous brine solution saturated with potassium chloride and sodium chloride, the solution may be cooled to bring about the precipitation of potassium chloride without the precipitation of sodium chloride. The reason for this is that below a magnesium chloride concentration of about 10% by weight (12 gm/100 gm $H_2O$, FIG. 2), the 80° F sodium chloride saturation curve is above the 230° F saturation curve. That is, as a brine solution saturated in potassium chloride and sodium chloride, but containing below about 10% by weight magnesium chloride is cooled, the brine becomes under-saturated in sodium chloride and over-saturated in potassium chloride. Thus, potassium chloride is precipitated substantially free of sodium chloride. Referring still to FIG. 2, it may also be seen that if an aqueous brine solution saturated in potassium chloride and sodium chloride contains magnesium chloride in an amount over about 10% by weight, sodium chloride and potassium chloride will both be precipitated when the solution is cooled from 230° to 80° F. Referring to FIG. 1 and to Table I below, it may be seen that when an aqueous brine solution saturated in potassium chloride and sodium chloride is cooled from 230° to 80° F, the recovery of precipitated potassium chloride increases with increasing concentrations of magnesium chloride in the brine solution.

TABLE I

POTASSIUM CHLORIDE RECOVERY FROM BRINE SOLUTIONS SATURATED IN POTASSIUM CHLORIDE AND SODIUM CHLORIDE AND CONTAINING VARIOUS CONCENTRATIONS OF MAGNESIUM CHLORIDE WHEN COOLED FROM 230° F TO 80° F

| Concentration of Magnesium Chloride (gm/100 gm $H_2O$) | Recovery of Potassium Chloride (% of total Contained in Solution) |
|---|---|
| 0 | 58% |
| 10 | 62% |
| 20 | 66% |
| 30 | 70% |
| 38 | 71% |

Thus, in accordance with the method of the present invention, the optimum concentration of magnesium chloride in the brine solution, i.e., the concentration at which the greatest recovery of substantially pure potassium chloride can be obtained is 10% by weight.

Magnesium chloride is found abundantly in the almost worthless mineral deposit known as carnallite. Carnallite consists of hydrous potassium-magnesium chloride ($KCl \cdot MgCl_2 \cdot 6H_2O$) and is commonly found associated with sylvinite ore deposits. Typical carnallite deposits contain magnesium chloride, potassium chloride and sodium chloride in about an equal weight ratio. In accordance with the present invention, the magnesium chloride added to the sylvinite brine solution is advantageously obtained from a carnallite ore deposit. Specifically, an aqueous medium is passed through a sylvinite deposit so that sodium chloride and potassium chloride contained therein are dissolved in the medium forming a brine solution. Simultaneously, a second aqueous medium is passed through a nearby carnallite deposit so that potassium chloride, sodium chloride and magnesium chloride are dissolved therein. The first and second brine solutions are then combined in a manner such that the resultant combined solution contains the desired concentrations of potassium chloride, sodium chloride and magnesium chloride.

Referring to FIGS. 1 and 2, let it be assumed that a sylvinite ore deposit containing two parts sodium chloride to one part potassium chloride is being mined in accordance with the present invention. The brine solution formed from the sylvinite deposit contains sodium chloride at a concentration of 28.6 grams per 100 grams of water and potassium chloride at a concentration of 14.3 grams per 100 grams of water. This stream is represented by point A on FIGS. 1 and 2. Simultaneously, a second aqueous medium is passed through a carnallite deposit containing sodium chloride, potassium chloride and magnesium chloride in equal weight ratio. The brine stream formed from the carnallite deposit contains sodium chloride at a concentration of 14.3 grams per 100 grams of water, potassium chloride at a concentration of 14.3 grams per 100 grams of water and magnesium chloride at a concentration of 14.3 grams/100 grams of water. This brine solution is represented on FIGS. 1 and 2 as point B. In accordance with the method of the present invention, the two brine streams are mixed such that the solubility of potassium chloride therein is reduced thereby requiring a minimum water removal to reach potassium chloride saturation and upon cooling there is no precipitation of sodium chloride. Assuming that the method is carried out at an evaporation temperature of 230° F and cooling temperature of 80° F, the concentration of magnesium chloride in the combined stream is represented by point C on FIGS. 1 and 2. Water is removed from this combined brine stream to saturate the brine in potassium chloride at 230° F, represented by point D on FIGS. 1 and 2. During this water removal step, sodium chloride precipitates. The remaining brine solution is next cooled from 230° to 80° F, represented by point E on FIGS. 1 and 2 causing a large quantity of potassium chloride to be precipitated without the precipitation of sodium chloride.

The temperatures of 230° and 80° F are typical of the temperature conditions actually encountered in solution mining operations of the type herein described. However, they are given herein by way of example only, and the method of the present invention may be carried out utilizing temperatures varying from those given.

In order to present a clear understanding of the present invention, the following examples are given:

EXAMPLE 1

In this example, potassium chloride is mined and recovered from a subterranean sylvinite deposit approximately 5,000 feet below the surface. The deposit is comprised of approximately 67% by weight sodium chloride and 33% by weight potassium chloride. Water is pumped through the sylvinite formation in a conventional manner at a formation temperature of approximately 140° F yielding a potassium chloride-sodium chloride brine saturated in sodium chloride containing 21.4% by weight sodium chloride and 10.7% by weight potassium chloride.

Simultaneously, water is pumped through a carnallite ore deposit having the following analysis:

| Component | Weight Percent |
|---|---|
| Magnesium Chloride | 20.6 |
| Potassium Chloride | 20.1 |
| Sodium Chloride | 20.0 |
| Water | 23.3 |
| Insolubles | 16.0 |

At a mining temperature of 140° F a brine solution containing 10.6% by weight magnesium chloride, 10.35% by weight potassium chloride and 10.3% by weight sodium chloride is yielded.

The brine solutions from the sylvinite and carnallite deposits are mixed in a manner such that the resultant combined stream contains 5% by weight magnesium chloride. The combined solution is then concentrated by evaporating water at 230° F until 47% of the initial water present is removed. During this step, 61% by weight of the sodium chloride present in the original solution precipitates. The remaining solution is separated from the sodium chloride and it is substantially saturated in potassium chloride and sodium chloride. This solution is cooled to 80° F causing 64% of the potassium chloride contained therein to precipitate. The process requires 4.9 units of water to be removed per unit of potassium chloride recovered.

EXAMPLE 2

Example 1 above is compared with the solution mining of the sylvinite deposit only. The sylvinite ore is mined at a temperature of 140° F yielding a brine containing 21.4% by weight sodium chloride and 10.7% by eight potassium chloride. In order to saturate the solution in potassium chloride, 59% by weight of the water present is evaporated at a temperature of 230° F. During the evaporation step, 68% of the sodium chloride in the initial solution is precipitated and after separation from the sodium chloride, the remaining solution is cooled to 80° F, causing 59% of the potassium chloride contained therein to be recovered as precipitate. The process requires 6.25 units of water to be removed per unit of potassium chloride recovered.

The present invention, therefore, is well adapted to carry out the objects and attain the ends and advantages mentioned as well as those inherent therein. While particular embodiments of the invention have been described, it will be understood that the invention is not limited thereto since many modifications may be made by those skilled in the art. Such modifications as fall within the true spirit and scope of the invention as defined by the appended claims and reasonable equivalents thereto are included as a part of the invention. For example, the step of concentrating the combined aqueous brine solution so that it is substantially saturated with potassium chloride may be carried out by any of a variety of water removal methods such as evaporation, freezing processes, reverse osmosis processes, etc.

What is claimed is:

1. A method of mining potassium chloride from a subterranean deposit containing potassium chloride and sodium chloride which comprises the steps of:
    passing an aqueous medium through said deposit so that the potassium chloride and sodium chloride are dissolved therein, thereby forming a first aqueous brine solution;
    passing a second aqueous medium through a second subterranean deposit containing potassium chloride, sodium chloride and magnesium chloride so that these salts are dissolved therein, thereby forming a second aqueous brine solution;
    combining said first and second aqueous brine solutions so that the resulting combined brine solution contains a maximum of 10% by weight magnesium chloride;
    concentrating said combined brine solution so that the solution is substantially saturated with potassium chloride;
    cooling said concentrated solution so that potassium chloride is precipitated therefrom substantially free of sodium chloride; and separating the mother liquor from said precipitated potassium chloride.

2. The method of claim 1 wherein the subterranean deposit containing potassium chloride and sodium chloride is sylvinite.

3. The method of claim 2 wherein said sylvinite deposit contains sodium chloride and potassium chloride in a weight ratio of about 2:1 respectively.

4. The method of claim 1 wherein said second subterranean deposit is carnallite.

5. The method of claim 4 wherein said carnallite deposit contains sodium chloride, potassium chloride and magnesium chloride in about equal weight ratio.

6. The method of claim 5 wherein the first and second aqueous solutions are combined in a manner such that the combined solution contains magnesium chloride in an amount of about 10% by weight.

7. A method of mining potassium chloride from a subterranean sylvinite deposit which comprises the steps of:
   contacting said sylvinite deposit with an aqueous medium so that potassium chloride and sodium chloride from said deposit are dissolved therein, thereby forming a first aqueous brine solution;
   contacting a carnallite deposit with a second aqueous medium so that potassium chloride, sodium chloride and magnesium chloride from said deposit are dissolved therein thereby forming a second aqueous brine solution;
   combining said first and second aqueous brine solutions so that an aqueous brine solution containing a maximum of 10% by weight magnesium chloride is produced wherein the solubility of potassium chloride is reduced;
   removing water from said combined aqueous brine solution so that the remaining solution is substantially saturated with potassium chloride;
   cooling the remaining solution so that potassium chloride is precipitated therefrom substantially free of sodium chloride; and
   separating the mother liquor from said potassium chloride.

8. The method of claim 7 wherein said sylvinite deposit contains sodium chloride and potassium chloride in a weight ratio of about 2:1 respectively.

9. The method of claim 8 wherein said carnallite deposit contains sodium chloride, potassium chloride and magnesium chloride in about an equal weight ratio.

10. The method of claim 9 wherein said first and second aqueous brine solutions are combined in a manner such that the combined solution contains magnesium chloride present in an amount of about 10% by weight.

11. The method of claim 10 wherein the step of removing water from said combined aqueous brine solution comprises:
    heating said solution so that a portion of the water contained therein is vaporized thereby concentrating said solution in potassium chloride to substantial saturation and precipitating sodium chloride therefrom; and
    separating the concentrated solution from said precipitated sodium chloride.

12. The method of claim 11 wherein the combined aqueous brine solution is heated to a temperature of about 230° F.

13. The method of claim 12 wherein the remaining solution is cooled to a temperature of about 80° F.

* * * * *